United States Patent
Okayama

(10) Patent No.: US 7,264,094 B2
(45) Date of Patent: Sep. 4, 2007

(54) FRICTION PAIR

(75) Inventor: Katsuya Okayama, Aichi-gun (JP)

(73) Assignee: Advics Co., Ltd., Kariya-shi, Aichi-Ken (JP)

( * ) Notice: Subject to any disclaimer, the term of this patent is extended or adjusted under 35 U.S.C. 154(b) by 0 days.

(21) Appl. No.: 11/497,397

(22) Filed: Aug. 2, 2006

(65) Prior Publication Data
US 2007/0071959 A1    Mar. 29, 2007

(30) Foreign Application Priority Data
Sep. 2, 2005    (JP)    ............................. 2005-255444

(51) Int. Cl.
    *F16D 65/12*    (2006.01)
(52) U.S. Cl. ........................... 188/218 XL; 188/218 R
(58) Field of Classification Search ........... 188/251 M, 188/250 B, 251 A, 218 XL–218 R; 523/149–159
    See application file for complete search history.

(56) References Cited

U.S. PATENT DOCUMENTS 3,967,037 A *  6/1976  Marzocchi et al. ......... 428/392
4,175,070 A * 11/1979  Klein et al. .................. 523/153
5,576,369 A * 11/1996  Kudo et al. .................. 524/413
2002/0153210 A1* 10/2002  Kurita et al. ............... 188/200
2006/0025495 A1*  2/2006  Khan et al. .................. 523/149

FOREIGN PATENT DOCUMENTS

| JP | 6-346932 | 12/1994 |
| JP | 7-3247 | 1/1995 |
| JP | 7-26031 | 1/1995 |
| JP | 2000-74112 | 3/2000 |

* cited by examiner

*Primary Examiner*—Christopher P. Schwartz
(74) *Attorney, Agent, or Firm*—Buchanan Ingersoll & Rooney PC

(57) ABSTRACT

A friction pair has a friction member and a mating member. A braking force is generated owing to a friction force generated between the friction member and the mating member. The friction member includes base fibers, a friction conditioner, a binder and copper oxide. The copper oxide has an average particle diameter of 1.5 μm or less. And an addition amount of the copper oxide is in the range of 0.5 to 7% by volume to an entirety of the friction member. Further, the mating member is made of an iron base material.

17 Claims, 4 Drawing Sheets ically
FRICTION PAIR

This application claims priority to Japanese patent application serial number 2005-255444, the contents of which are incorporated herein by reference.

BACKGROUND OF THE INVENTION

1. Field of the Invention

The present invention relates to a friction pair that has a friction member and a mating member. The friction member and the mating member generate a braking force owing to a friction force generated between them.

2. Description of the Related Art

Various performances have been demanded on a friction pair. For instance, one that is difficult to generate a vibration (judder) at the braking is in demand.

The judder is caused when a rotor (mating member) is subjected to an uneven wear. That is, as shown in FIG. 1, when the rotor rotates with wobbling largely in an axial direction at the time of high-speed running, the rotor contacts partially with the friction member at low surface pressure at the time of idle running, which is a non-braking time. Thus the rotor is partially ground and the uneven wear (DTV: Disc rotor Thickness Variation) is generated on the rotor. When the friction member is pressed against the rotor having a large DTV, a magnitude of the braking force wobbles and the judder occurs.

One method to suppress the judder is by reducing the aggressiveness of the friction member in relation to the rotor, thereby suppressing the occurrence of DTV. For instance, the friction member contains a raw material with a high aggressiveness, and an amount of the raw material is reduced. Or a soft raw material such as rubber is added to the friction member.

However, in the friction member where the raw material with a high aggressiveness is reduced, the friction coefficient becomes low and as a result a friction performance cannot be sufficiently satisfied.

In the friction member where rubber is added, the elastic force of the rubber disturbs the aggressiveness of the friction member. However, when the braking temperature becomes higher, the rubber is denatured. Accordingly, there is a problem in that, owing to the denaturing of the rubber, the performance of disturbing the aggressiveness against the rotor becomes incapable of maintaining and a decomposed material deteriorates the friction coefficient.

Various friction members are described in JP-A-6-346932, JP-A-7-26031 and JP-A-7-3247, yet none of these references provides a suitable solution for the suppression of the judder.

The friction member disclosed in JP-A-6-346932 includes 0.5 to 20% by weight of copper oxide powder. Thus the copper oxide powder may suppress noise, while securing the friction coefficient and the friction stability. Yet, this disclosure fails to teach, suggest or disclose a particle diameter of the copper oxide powder.

The friction member disclosed in JP-A-7-26031 includes powder of an ash layer reinforcing agent. Thus the powder may suppress an organic component from becoming ash and may prevent the friction member from disintegrating and disappearing. The powder is made of a raw material such as copper oxide and causes a sintering reaction in an ashing temperature region to strongly bond an ash component. Yet, this disclosure discloses a prefered amount of copper oxide to be 10 to 20% by volume.

The friction member disclosed in JP-A-7-3247 includes a copper compound such as copper oxide. Thus the copper compound may improve a balance between the mechanical strength and the friction characteristics. The copper compound has an average particle diameter in the range of several to several tens µm and an addition amount thereof is in the range of 1 to 10% by volume.

However, the above three types of friction member are neither developed for suppressing the judder nor suitable for suppressing the judder. Furthermore, in the friction member involving JP-A-7-26031, there is a problem in that the amount of copper oxide by volume, as disclosed, retracts from the moldability and thus manufacturability of the end product.

Thus, there is need in the art for a friction pair, in which a friction pair is able to suppress the judder stably and a friction member is able to be molded excellently.

SUMMARY OF THE INVENTION

It is accordingly an object of the present invention to provide a friction pair able to suppress judder stably and a friction member able to be molded excellently.

In one aspect of the present invention, a friction member includes base fibers, a friction conditioner, a binder and copper oxide. The copper oxide has an average particle diameter of 1.5 µm or less and an addition amount thereof is in the range of 0.5 to 7% by volume to a total of the friction member. Further, at least one surface of a mating member is made of an iron base material.

The inventors, after studying hard, found that, when the friction member includes copper oxide and the mating member includes iron, the aggressiveness of the friction member against the mating member becomes smaller and thereby the mating member can be suppressed from uneven wear. It is contemplated that, when the friction member and the mating member sliding contact mutually, copper oxide and iron react to form a protective coating film on a surface of the mating member. As a result, it is considered that the aggressiveness of the friction member against the mating member becomes smaller, the mating member is suppressed from uneven wear, and thereby judder can be suppressed.

Furthermore, copper oxide is excellent in the heat resistance compared with rubber, that is, copper oxide is not denatured like rubber even when the braking temperature becomes higher. Accordingly, the friction member, even after the high temperature hysteresis, can stably maintain small aggressiveness against the mating member.

Furthermore, the friction member is found from an experimental result that since an addition amount of copper oxide is 7% or less by volume of an entirety of the friction member, fissuring is less likely to occur at the molding, that is, the moldability of the friction is excellent.

It is preferable that, in the aspect of the invention, an average particle diameter of copper oxide is 0.05 µm or more.

Accordingly, the copper oxide, being 0.05 µm or more in the average particle diameter, is more excellent in the handling property thereof than copper oxide of which average particle diameter is less than 0.05 µm, less expensive in cost and excellent in the stability of the raw material.

It is preferable that, in the aspect of the invention, an addition amount of copper oxide is in the range of 3 to 7% by volume to an entirety of the friction member.

Accordingly, since the addition amount of copper oxide is 3% by volume or more, the aggressiveness of the friction member against the mating member can be made sufficiently small.

It is preferable that, in the aspect of the invention, when the friction member and the mating member are in sliding contact, copper oxide contained in the friction member and iron contained in the mating member react to form a protective film on a surface of the mating member.

Thereby, the protective film reduces the aggressiveness of the friction member against the mating member. And the mating member can be suppressed from uneven wear, and thereby the judder can be suppressed from occurring.

DETAILED DESCRIPTION OF THE INVENTION

Each of the additional features and teachings disclosed above and below may be utilized separately or in conjunction with other features and teachings to provide improved friction pairs. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
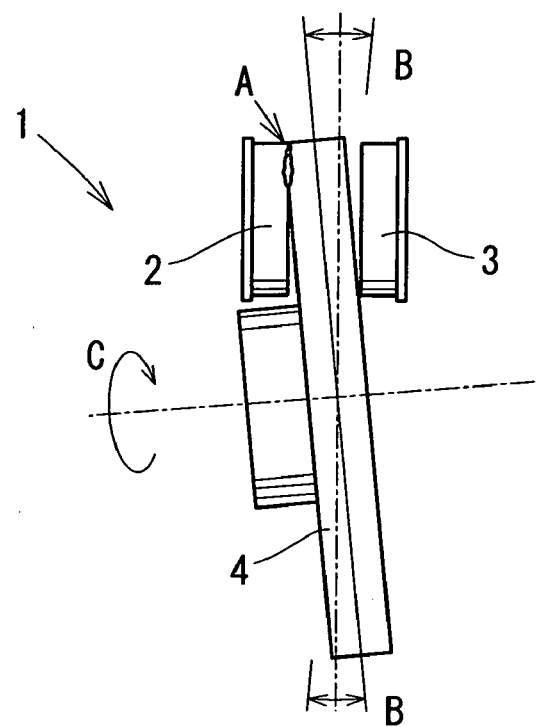
FIG. 1 is a side view of a mating member and a friction member in a state of idling.

As shown in FIG. 1, a friction pair 1 of the present invention has friction members (pads) 2, 3 and a mating member (rotor) 4. When the friction members 2 and 3 are in sliding contact with the mating member 4, a friction force is generated between them and the friction force generates a braking force.

The mating member 4 is made of an iron base material such as cast iron or stainless steel. Mating member 4 can be entirely made of the iron base material, or at least a surface made of the iron base material.

The friction members 2 and 3 contain, as main components, base fibers, a friction conditioner (filler), a binder and copper oxide.

As the base fibers of the friction members 2 and 3, inorganic fibers and organic fibers can be appropriately selected and used. Examples of inorganic fiber may include but is not limited to, copper fiber, iron fiber, steel fiber, glass fiber, ceramic fiber (alumina-silica base ceramic fiber etc.) and potassium titanate fiber can be used. Examples of organic fiber may include but is not limited to, aramid fiber can be used. The base fibers can be used separately or several kinds thereof may be mixed and used.

The amount of the base fibers is preferably in the range of 10 to 50% of the total weight of the friction member.

The friction conditioner (filler) is included in order to adjust a friction coefficient, to reduce noise and to prevent corrosion. As the friction conditioner, inorganic filler, organic filler and lubricant can be appropriately used.

Examples of the inorganic filler may include but is not limited to, calcium hydroxide, barium sulfate, calcium carbonate, silicon carbide, alumina, zirconium oxide, magnesium oxide, mica, kaolin and talc. Examples of the organic filler may include but is not limited to, cashew dust and rubber dust. Examples of the lubricant may include but is not limited to, graphite, antimony trisulfide, molybdenum disulfide and zinc disulfide.

Examples of binder, may include but is not limited to, phenolic resin, imide resin, rubber-modified phenolic resin, melamine resin, epoxy resin, NBR, nitrile rubber and acrylic rubber. The binders can be used singularly or in a combination of two or more kinds thereof. The amount of the binder is preferably in the range of 5 to 30% by volume to a total of the friction member.

Copper oxide contained in the friction members 2 and 3 is copper oxide (I) $Cu_2O$ or copper oxide (II) CuO. It may take a mode that contains only any one thereof or a mode that contains both thereof.

Copper oxide as contemplated by the present invention has an average particle diameter of 1.5 μm or less. An average particle diameter is preferably in the range of 0.05 to 1.5 μm, more preferably in the range of 0.1 to 1.5 μm and particularly preferably in the range of 0.1 to 1 μm.

The amount of copper oxide is, relative to a total of the friction member, in the range of 0.5 to 7% by volume, preferably in the range of 3 to 7% by volume and more preferably in the range of 5 to 6% by volume.

Next, a manufacturing method of the friction members 2 and 3 will be described.

In the beginning, raw materials of the friction member are uniformly mixed in dry to obtain a raw material mixture. As a blender, an Eirich mixer, a universal mixer and a Lodige mixer can be used.

Subsequently, the raw material mixture is pre-molded with a pre-molding die to form a pre-molded body.

The pre-molded body is heated and molded under pressure in a molding die to form a molded body. A molding temperature at the heating and molding under pressure is in the range of 130 to 200° C., molding pressure is in the range of 10 to 100 MPa and a molding time period is in the range of 2 to 15 min.

Subsequently, as needs arise, the molded body is thermally hardened at a temperature in the range of 140 to 400° C. for 2 to 48 hr.

Examples of the present invention and comparative examples will now be described.

Friction members of the examples and friction members of the comparative examples are formed of raw material mixtures based on raw material components and compounding amounts shown in Table 1. The amount of copper oxide is represented by x and copper oxide replaces barium sulfate as shown in Table 1.

As shown in Tables 2 and 3, copper oxide is copper oxide (I) $Cu_2O$ or copper oxide (II) $CuO$, an average particle diameter thereof is 0.05, 1.5 or 3 μm and an addition amount x thereof is 3, 7, 10 or 15% by volume.

Among these, the friction members as contemplate in the above ranges of the present invention are shown with a y mark in Tables 2 and 3. As one of the comparative examples, a friction member that does not contain copper oxide, shown in the first row, was prepared as well.

As a manufacturing method of the friction member, in the beginning, raw materials shown in Table 1 were dry mixed by use of a universal mixer for 5 min and thereby a raw material mixture was obtained. The raw material mixture was heated and molded under pressure at a molding temperature of 160° C. and molding pressure of 20 MPa for a molding time of 10 min, and thereby a molded body was obtained. Thereafter, the molded body was thermally hardened under conditions of 230° C. and 3 hr.

As the mating member, a rotor (disc rotor) entirely made of cast iron was prepared.

TABLE 1

|  |  | vol. % |
|---|---|---|
| Base Fibers | Aramid Fiber | 10 |
|  | Copper Fiber | 5 |
|  | Ceramic Fiber | 8 |
| Friction Conditioner | Graphite | 5 |
|  | Cashew Dust | 5 |
|  | Calcium Hydroxide | 2 |
|  | Barium Sulfate | 45-x |
| Binder | Phenolic Resin | 20 |
| Copper Oxide |  | x |
| Total |  | 100 |

An addition amount x of copper oxide in Table 1 replaces an addition amount of barium sulfate.

TABLE 2

$Cu_2O$ Copper Oxide (I)

| Particle Diameter (μm) | Percentage Of entire volume (vol. %) | Invention | Increase in Amount of DTV After Test | Friction Coefficient Before High Temperature Hysteresis | Friction Coefficient After High Temperature Hysteresis | Moldability of Friction Member | Overall Judgment |
|---|---|---|---|---|---|---|---|
|  | 0 |  | 27 | 0.401 | 0.387 | A | C |
| 0.05 | 3 | y | 22 | 0.401 | 0.385 | A | B |
|  | 7 | y | 15 | 0.409 | 0.388 | B | B |
|  | 10 |  | 10 | 0.410 | 0.389 | D | C |
|  | 15 |  | 9 | 0.411 | 0.389 | D | C |
| 1.5 | 3 | y | 21 | 0.402 | 0.389 | A | B |
|  | 7 | y | 18 | 0.411 | 0.391 | A | A |
|  | 10 |  | 18 | 0.412 | 0.391 | D | C |
|  | 15 |  | 19 | 0.412 | 0.390 | D | C |
| 3 | 3 |  | 28 | 0.412 | 0.400 | A | C |
|  | 7 |  | 29 | 0.414 | 0.402 | A | C |
|  | 10 |  | 29 | 0.415 | 0.401 | B | C |
|  | 15 |  | 31 | 0.415 | 0.400 | B | C |

TABLE 3

CuO Copper Oxide (II)

| Particle Diameter (μm) | Percentage Of entire volume (vol. %) | Invention | Increase in Amount of DTV After Test | Friction Coefficient Before High Temperature Hysteresis | Friction Coefficient After High Temperature Hysteresis | Moldability of Friction Member | Overall Judgment |
|---|---|---|---|---|---|---|---|
|  | 0 |  | 27 | 0.401 | 0.387 | A | C |
| 0.05 | 3 | y | 20 | 0.398 | 0.382 | A | B |
|  | 7 | y | 16 | 0.402 | 0.383 | B | B |
|  | 10 |  | 9 | 0.405 | 0.385 | D | C |
|  | 15 |  | 8 | 0.406 | 0.389 | D | C |
| 1.5 | 3 | y | 19 | 0.400 | 0.387 | A | B |
|  | 7 | y | 16 | 0.405 | 0.393 | A | A |
|  | 10 |  | 17 | 0.406 | 0.395 | D | C |
|  | 15 |  | 18 | 0.408 | 0.396 | D | C |
| 3 | 3 |  | 27 | 0.404 | 0.391 | A | C |
|  | 7 |  | 28 | 0.406 | 0.393 | A | C |
|  | 10 |  | 28 | 0.409 | 0.399 | B | C |
|  | 15 |  | 30 | 0.409 | 0.400 | B | C |

Figure 6:
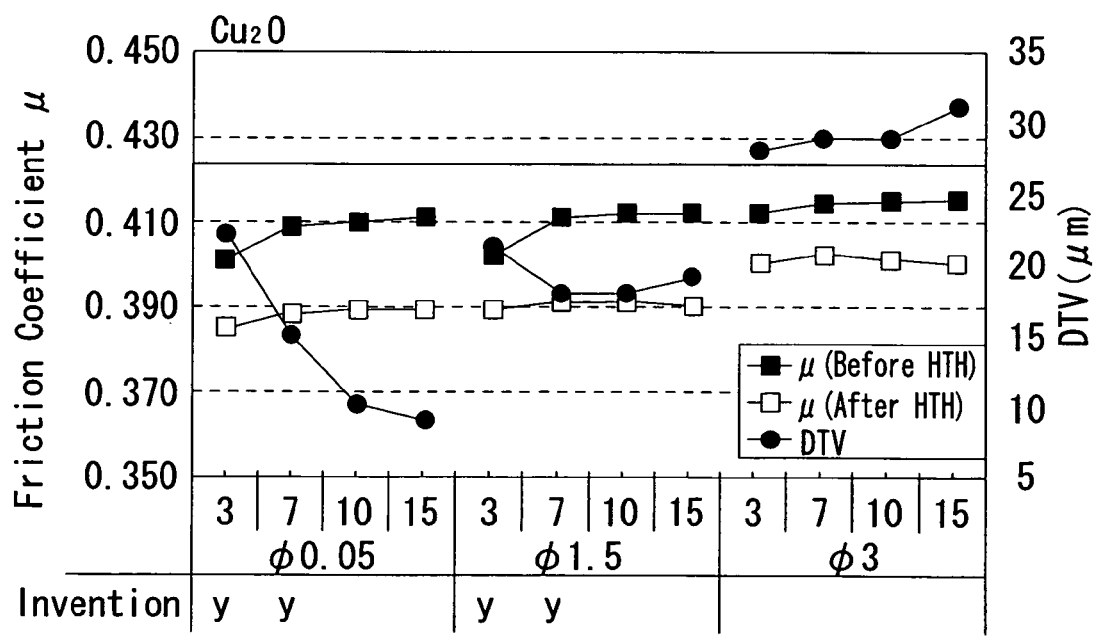
FIG. 6 is a diagram of an experimental result of a friction-member including $Cu_2O$.
Figure 7:
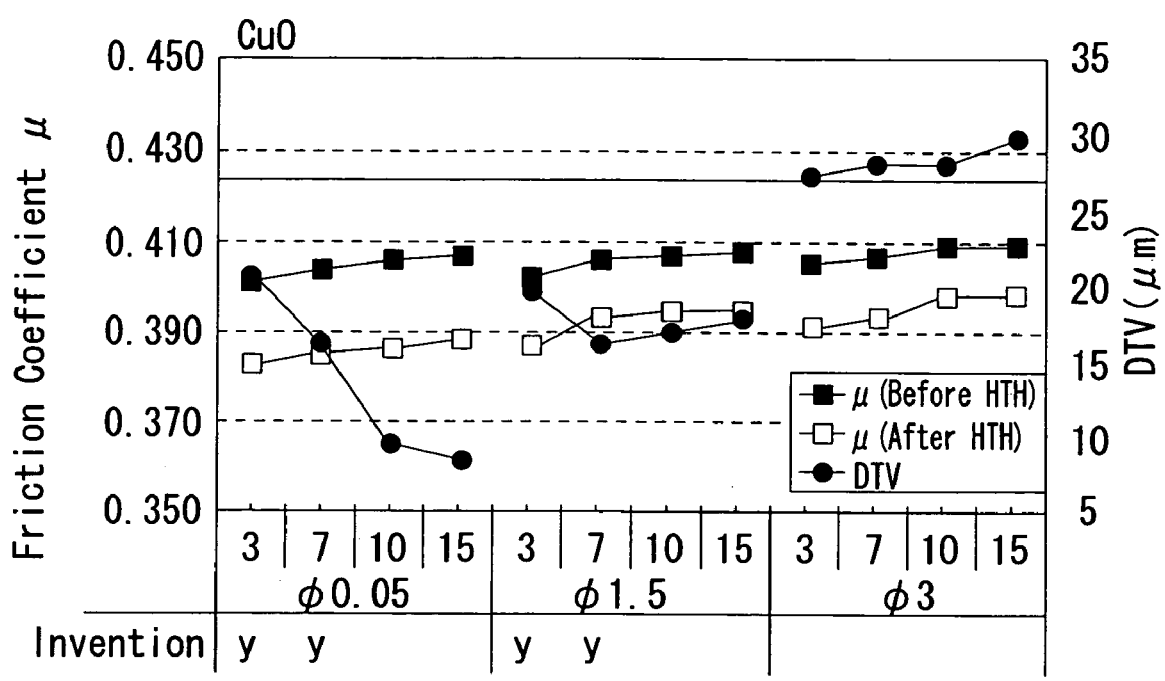
FIG. 7 is a diagram of an experimental result of a friction member including CuO.

Next, friction pairs were made by combined the mating member (rotor) and two friction members of the one type friction member. The respective characteristics of the friction pairs were measured, and measurements are summarized in Tables 2 and 3 and FIGS. 6 and 7.

Figure 5:
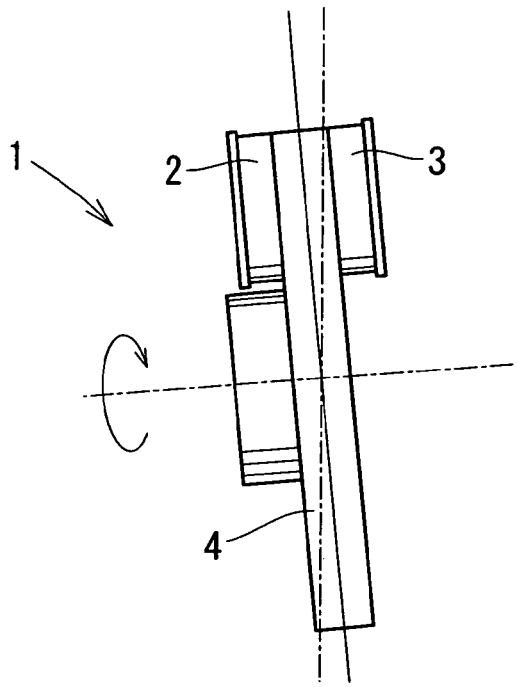
FIG. 5 is a side view of the mating member and the friction member while braking, that is, while in mutual sliding contact.

Increase in Amount of DTV After Test: As shown in FIG. 1, on a bench tester, a mating member 4 was set so that an amplitude (initial amplitude of a rotor) B of the mating member (rotor) 4 is approximately 100 µm, and, as shown in FIG. 5, friction members 2 and 3 were pressed against and sliding contacted with the mating member 4. The sliding contact was carried out 50 times under the conditions of 65→0 km/h, a deceleration rate of 3.5 m/s$^2$ and a friction member temperature before braking of 90° C. Then, as shown in FIG. 1, the rotor was run idle at 100 km/h for 1 hr, followed by continuously applying 10 times of braking of 100→65 km/h. With the above as one cycle, 30 cycles were carried out in total.

Figure 2:
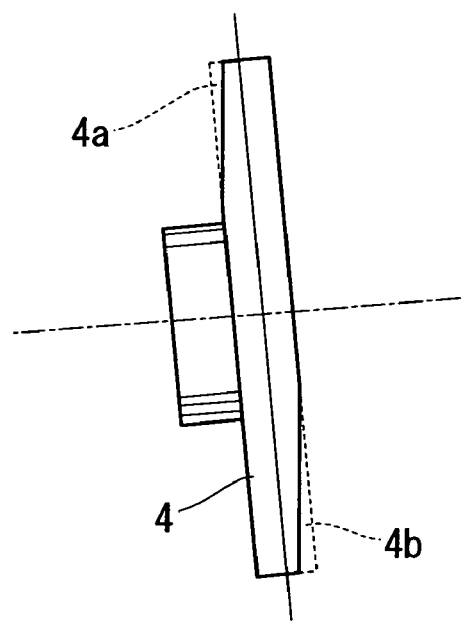
FIG. 2 is a side view of the mating member after DTV is generated.
Figure 3:
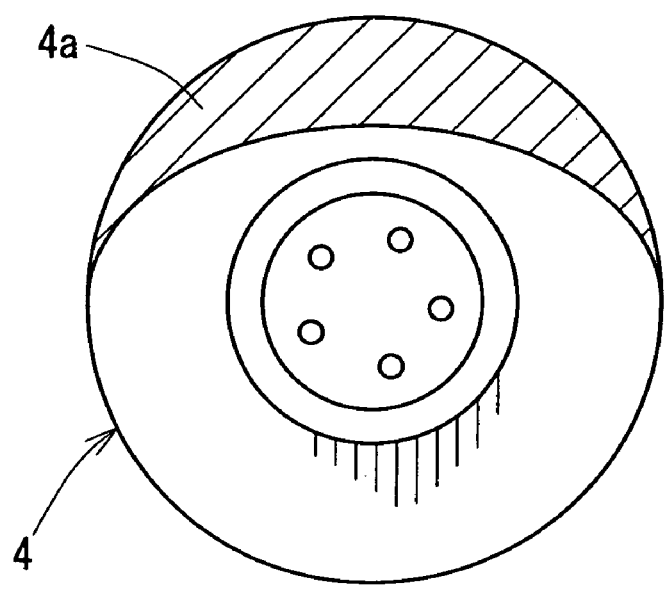
FIG. 3 is a front view of the mating member to show an inner side surface of the mating member.
Figure 4:
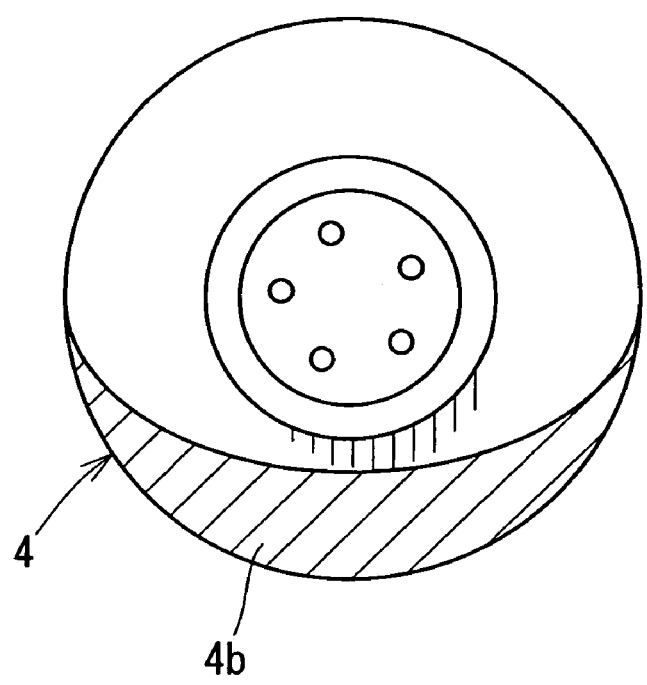
FIG. 4 is a back view of the mating member to show an outer side surface of the mating member.

As a result, in the mating member 4, as shown in FIGS. 2 and 3, on an outer side surface (left side surface of FIG. 2), an uneven wear portion 4a was generated and, as shown in FIGS. 2 and 4, on an inner side surface (right side surface in FIG. 2), an uneven wear portion 4b was generated. Then, the maximum difference from the initial DTV (Disc rotor Thickness Variation) was measured to obtain an increase of an amount of DTV, and results are summarized in Tables 2 and 3 and FIGS. 6 and 7.

Friction Coefficient before High Temperature Hysteresis and Friction Coefficient after High Temperature Hysteresis: Next, bench tests were carried out to measure the friction coefficients before and after the brake fade (before and after the high temperature hysteresis), followed by calculating average values, and results are summarized in Tables 2 and 3 and FIGS. 6 and 7.

Moldability of Friction member: Fissure of the molded friction member was visually observed, thereby the moldability thereof was evaluated based on four grades below, and results are summarized in Tables 2 and 3. A: very excellent, B: excellent, C: acceptable limit, D: unusable Overall Judgment: The respective characteristics were comprehensively judged based on three grades described below and results are summarized in Tables 2 and 3.

A: One that satisfies all conditions of the increase of amount of DTV after test being less than 20 µm, the friction coefficients before and after the fade being 0.35 or more and the moldability of the friction member being very excellent.

B: One that satisfies all conditions of the increase of amount of DTV after test being less than 27 µm, the friction coefficients before and after the fade being 0.35 or more and the moldability of the friction member being very excellent but does not correspond to the above A.

C: One that does not satisfy the conditions of the above A and B.

From the experimental results, the followings were found.

Increase in Amount of DTV after Test: It was found that the friction member that contains copper oxide having an average particle diameter of 3 µm results in a larger (27 µm or more) in the DTV than the friction member that does not contain copper oxide. And the friction members that contain copper oxide having average particle diameters of 0.05 and 1.5 µm, respectively, results in a smaller (27 µm or less) in the DTV than the friction member that does not contain copper oxide.

It was found that, in the friction member that contains copper oxide having an average particle diameter of 0.05 µm, the higher the percentage volume of copper oxide there is, the smaller the increase in amount of DTV is.

It was further found that the increase in amount of DTV does not show large difference between copper oxide (I) $Cu_2O$ and copper oxide (II) CuO.

Friction Coefficient before High Temperature Hysteresis and Friction Coefficient after High Temperature Hysteresis: It was found that the friction coefficient before the high temperature hysteresis is substantially same between the friction member that does not contain copper oxide and the friction member that contains copper oxide, or that of the friction member containing copper oxide is larger.

It was found that the friction coefficient after the high temperature hysteresis is substantially same between the friction member that does not contain copper oxide and the friction member that contains copper oxide, or that of the friction member containing copper oxide is larger. Accordingly, it was found that the addition of copper oxide, in this example, has an insubstantial effect on the friction coefficient.

It was found that a decrease in the friction coefficient owing to the high temperature hysteresis is substantially same between the friction member that does not contain copper oxide and the friction member that contains copper oxide. Accordingly, it was found that the decrease in the friction coefficient owing to the high temperature hysteresis does not depend on the presence of copper oxide.

Moldability of Friction member: It was found that, in the friction member, the less copper oxide is added, the better the moldability thereof is.

It was found that the moldability of the friction member that contains copper oxide having an average particle diameter of 0.05 µm becomes very excellent at the amount of 3% by volume and excellent at the amount of 7% by volume. It was found that the moldability of the friction member that contains copper oxide having an average particle diameter of 1.5 µm becomes very excellent at both of the amounts of 3 and 7% by volume.

This invention claims:

1. A friction pair, comprising:
    a friction member; and
    a mating member,
    wherein a braking force is generated resulting from a friction force generated between the friction member and the mating member,
    wherein the friction member includes a base fiber, a friction conditioner, a binder and copper oxide, the copper oxide having an average particle diameter of 1.5 µm or less and also making up between 0.5 to 7% of the entire friction member volume,
    wherein a portion of the mating member is made of an iron base material, and
    wherein the copper oxide contained in the friction member and the iron contained in the mating member react to form a protective film on a surface of the mating member when the friction member is in sliding contact with the mating member.

2. The friction pair as in claim 1, wherein the average particle diameter of copper oxide is not less than 0.05 µm.

3. The friction pair as in claim 1, further wherein the friction member is made up of copper oxide between 3 to 7% of the entire friction member volume.

4. The friction pair as in claim 1, wherein the base fiber is selected from the group consisting of organic and inorganic fibers.

5. The friction pair as in claim 1, wherein the base fiber is selected from the group consisting of copper fiber, iron fiber, steel fiber, glass fiber, ceramic fiber and potassium titanate fiber.

6. The friction pair as in claim 1, wherein the friction conditioner is selected from the group consisting of organic and inorganic fillers.

7. The friction pair as in claim 1, wherein the friction conditioner is selected from the group consisting of calcium hydroxide, barium sulfate, calcium carbonate, silicon carbide, alumina, zirconium oxide, magnesium oxide, mica, kaolin and talc.

8. The friction pair as in claim 1, wherein the friction conditioner is selected from the group consisting of cashew dust and rubber dust.

9. The friction pair as in claim 1, wherein the binder is selected from the group consisting of phenolic resin, imide resin, rubber-modified phenolic resin, melamine resin, epoxy resin, NBR, nitrile rubber and acrylic rubber.

10. A braking system comprising:
a friction member; and
a mating member including iron,
wherein the friction member includes copper oxide having an average particle diameter of at least less than 1.5 μm, further wherein approximately 0.5 to 7% of the entire friction member volume is the copper oxide, and
wherein the copper oxide contained in the friction member and the iron contained in the mating member react to form a protective film on a surface of the mating member when the friction member is in sliding contact with the mating member.

11. The braking system of claim 10, wherein the friction member further includes a base fiber, a friction conditioner and a binder.

12. The braking system of claim 11, wherein the base fiber is selected from the group consisting of organic and inorganic fibers.

13. The braking system of claim 11, wherein the base fiber is selected from the group consisting of copper fiber, iron fiber, steel fiber, glass fiber, ceramic fiber and potassium titanate fiber.

14. The braking system of claim 11, wherein the friction conditioner is selected from the group consisting of organic and inorganic fillers.

15. The braking system of claim 11, wherein the friction conditioner is selected from the group consisting of calcium hydroxide, barium sulfate, calcium carbonate, silicon carbide, alumina, zirconium oxide, magnesium oxide, mica, kaolin and talc.

16. The braking system of claim 11, wherein the friction conditioner is selected from the group consisting of cashew dust and rubber dust.

17. The braking system of claim 11, wherein the binder is selected from the group consisting of phenolic resin, imide resin, rubber-modified phenolic resin, melamine resin, epoxy resin, NBR, nitrile rubber and acrylic rubber.

* * * * *